(12) United States Patent
Pundak (10) Patent No.: US 12,093,486 B2
(45) Date of Patent: Sep. 17, 2024

(54) MOVEMENT-BASED TOUCH-SENSOR RECALIBRATION CONTROL

(71) Applicant: Microsoft Technology Licensing, LLC, Redmond, WA (US)

(72) Inventor: Gilad Pundak, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,987

(22) Filed: Jun. 1, 2022

(65) Prior Publication Data

US 2023/0393691 A1 Dec. 7, 2023

(51) Int. Cl.
*G06F 3/044* (2006.01)
*G06F 3/041* (2006.01)
*G06F 3/042* (2006.01)

(52) U.S. Cl.
CPC ........ *G06F 3/04186* (2019.05); *G06F 3/0425* (2013.01); *G06F 3/0446* (2019.05); *G06F 2203/04101* (2013.01); *G06F 2203/04106* (2013.01)

(58) Field of Classification Search
CPC .. G06F 3/04186; G06F 3/0425; G06F 3/0446; G06F 2203/04101; G06F 2203/04106
See application file for complete search history.

(56) References Cited

U.S. PATENT DOCUMENTS

| | | | |
|---|---|---|---|
| 7,907,838 B2 | 3/2011 | Nasiri et al. | |
| 8,928,595 B2 | 1/2015 | Geiger | |
| 9,076,087 B2 | 7/2015 | Naruse et al. | |
| 10,514,780 B2 | 12/2019 | Su et al. | |
| 10,963,097 B2 | 3/2021 | Wang | |
| 11,036,336 B2 | 6/2021 | Takiguchi | |
| 11,106,314 B2 | 8/2021 | Krishnakumar et al. | |
| 2013/0257816 A1* | 10/2013 | Omura | G06F 3/0428 345/175 |
| 2015/0036180 A1* | 2/2015 | Naruse | G06K 15/005 358/1.15 |

(Continued)

FOREIGN PATENT DOCUMENTS

| | | |
|---|---|---|
| JP | 2019220016 A | 12/2019 |
| WO | 2021009480 A1 | 1/2021 |

OTHER PUBLICATIONS

Jiang, et al., "Research on Multi-Point Calibration and Touch Pressure of Touch-Screen", in Journal of Applied Mechanics and Materials, vols. 198-199, Sep. 26, 2012, pp. 1290-1293.

(Continued)

*Primary Examiner* — Jonathan A Boyd (74) *Attorney, Agent, or Firm* — Alleman Hall & Tuttle LLP (57) ABSTRACT

An electronic device comprises a touch sensor, a movement sensor, and recalibration logic. The touch sensor provides input to the electronic device. The movement sensor has an output that varies in dependence on movement of the electronic device, and the recalibration logic is configured to vary a rate of successful recalibration of the touch sensor based at least partly on the output of the movement sensor. The successful recalibration comprises replacement of a stored calibration mapping of each of a plurality of (X, Y) coordinates of the touch sensor to a corresponding touch-free capacitance.

17 Claims, 7 Drawing Sheets

(56) References Cited

U.S. PATENT DOCUMENTS

| | | |
|---|---|---|
| 2015/0301598 A1 | 10/2015 | Itoh |
| 2015/0363012 A1* | 12/2015 | Sundara-Rajan ..... G06F 3/0441 345/179 |
| 2017/0071678 A1* | 3/2017 | Uchida .................. A61B 34/25 |
| 2017/0090659 A1 | 3/2017 | Shiozaki |
| 2018/0232101 A1 | 8/2018 | Fotopoulos |
| 2022/0057886 A1 | 2/2022 | Sheng et al. |
| 2022/0058363 A1 | 2/2022 | Moon et al. |

OTHER PUBLICATIONS

"International Search Report and Written Opinion Issued in PCT Application No. PCT/US23/018443", Mailed Date: Jul. 20, 2023, 13 Pages.

\* cited by examiner

MOVEMENT-BASED TOUCH-SENSOR RECALIBRATION CONTROL

BACKGROUND

A touch sensor is an input component of many different kinds of electronic devices. In some examples a touch sensor comprises optically transparent material layered above or integrated within a display panel of an electronic device—a configuration offering combined touch sensing and display functionality. In order to maintain performance, a touch sensor of an electronic device can be recalibrated many times during the lifetime of the device.

SUMMARY

One aspect of this disclosure relates to a method for recalibrating a touch sensor of an electronic device. The method comprises (a) sensing movement of the electronic device, and (b) varying the rate of successful recalibration of the touch sensor based at least partly on the movement. In this method, the successful recalibration comprises replacement of a stored calibration mapping of each of a plurality of (X, Y) coordinates of the touch sensor to a corresponding touch-free capacitance.

Another aspect of this disclosure relates to an electronic device comprising a touch sensor, a movement sensor, and recalibration logic. The touch sensor provides input to the electronic device. The movement sensor has an output that varies in dependence on movement of the electronic device, and the recalibration logic is configured to vary the rate of successful recalibration of the touch sensor based at least partly on the output of the movement sensor. The successful recalibration comprises replacement of a stored calibration mapping of each of a plurality of (X, Y) coordinates of the touch sensor to a corresponding touch-free capacitance.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

This disclosure is about controlling on-the-fly (OTF) recalibration of a touch sensor of a handheld electronic device. OTF recalibration can greatly improve touch-sensor performance, reducing touch ghosts and dead zones that may occur due to changing baseline coupling in the touch sensor. Recalibration should only be enacted when the touch sensor is undisturbed, however. Otherwise the calibration mapping may be corrupted by adventitious user touch and other noise sources. Operationally, the determination that the touch sensor is undisturbed is made heuristically by recalibration logic of the electronic device. Device movement, when sensed, is used as an indication that the device is in use, that the user is liable to disturb the touch sensor, and that the recalibration should be postponed. By contrast, the absence of movement is taken as an indication that it may be safe to recalibrate the touch sensor without risk of user interference. Proximity sensing of human beings in the vicinity of the electronic device may be used in a similar manner, and both sensory inputs, among others, may be combined to yield a robust estimation of whether or not to proceed with OTF recalibration.

The solutions herein provide numerous technical benefits and improvements over existing strategies, which control recalibration based on fewer or more ambiguous inputs. First among the advantages is reduction in missed opportunities to recalibrate due to erroneous prediction that the touch sensor could be disturbed during the recalibration. Leveraging the advantage of more reliable OTF recalibration, the solutions herein de-emphasize the need for factory calibration, thereby freeing up valuable flash memory that might otherwise be reserved for a factory-calibration mapping. In general, these solutions require no sensory componentry beyond what is commonly included, and maintained in a powered-up state, in typical handheld devices, and indeed the disclosed approach can be implemented to use sensory inputs provided for other purposes.

Figures 1A, 1B:
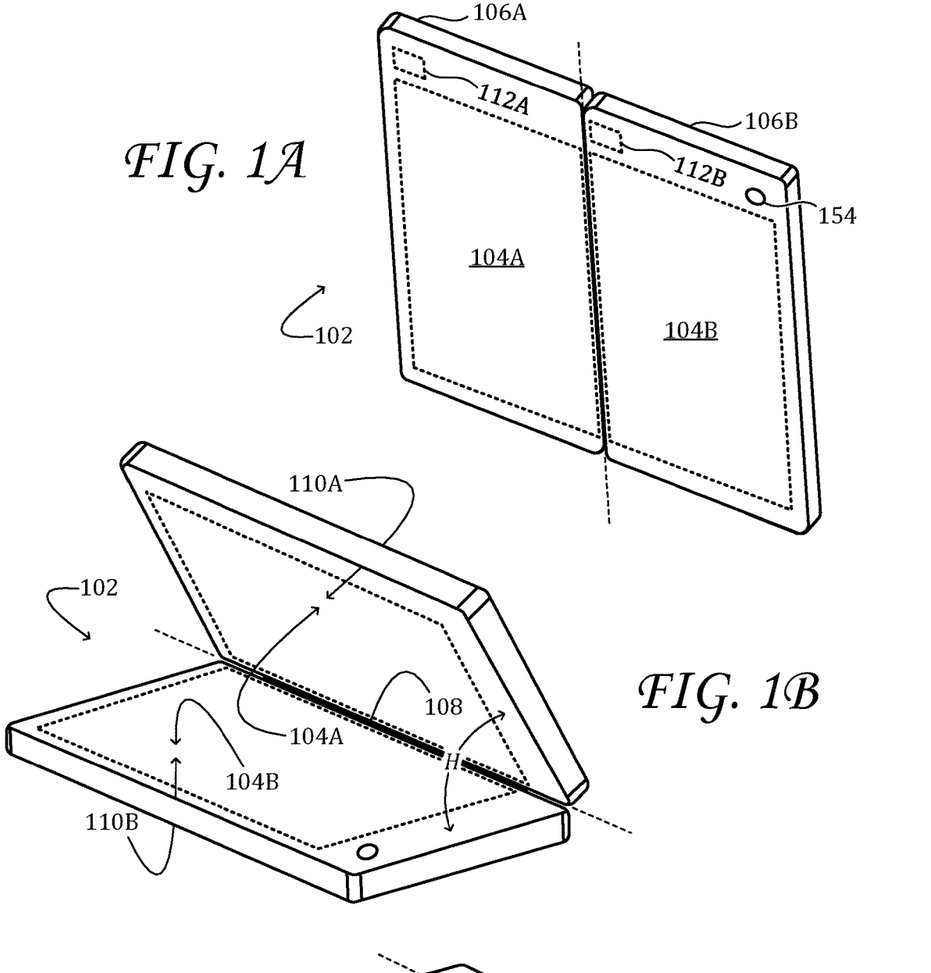
FIGS. 1A through 1C show aspects of an example electronic device having two touch sensors.
Figure 1C:
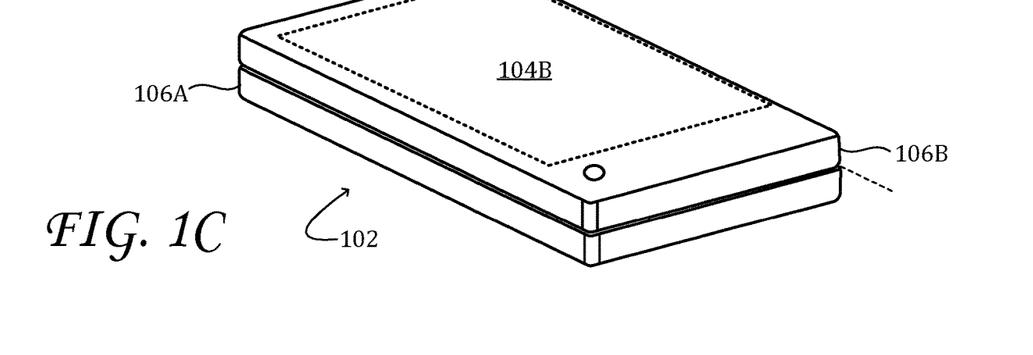

Turning now to the drawings, FIGS. 1A through 1C show aspects of an example electronic device 102—a smartphone, tablet computer, handheld game system, or virtually any other kind of handheld device. The electronic device includes a first touch sensor 104A and a second touch sensor 104B. Each touch sensor is configured to provide input to the electronic device. In the illustrated example, electronic device 102 is a foldable, handheld device with opposing first and second enclosures 106A and 106B, connected via hinge 108. Within the first and second enclosures, first and second display panels 110A and 110B, and first and second digitizers 112A and 112B, are set behind the respective first and second touch sensors. Coupled electronically to the first and second touch sensors, the first and second digitizers are electronic circuits configured to interrogate, and receive data from, the touch sensors. Display panels 110 may comprise liquid-crystal display (LCD) or organic light-emitting diode (OLED) componentry in some examples. More generally, an electronic device may employ any kind of display technology, or none at all. In the illustrated example, rotation of the first and second enclosures about the axis of the hinge allows the adjacent touch sensors and associated display panels to be used in various orientations. In other examples an electronic device may include only one touch sensor, or more than two, and a hinge is not necessarily required.

Figure 2:
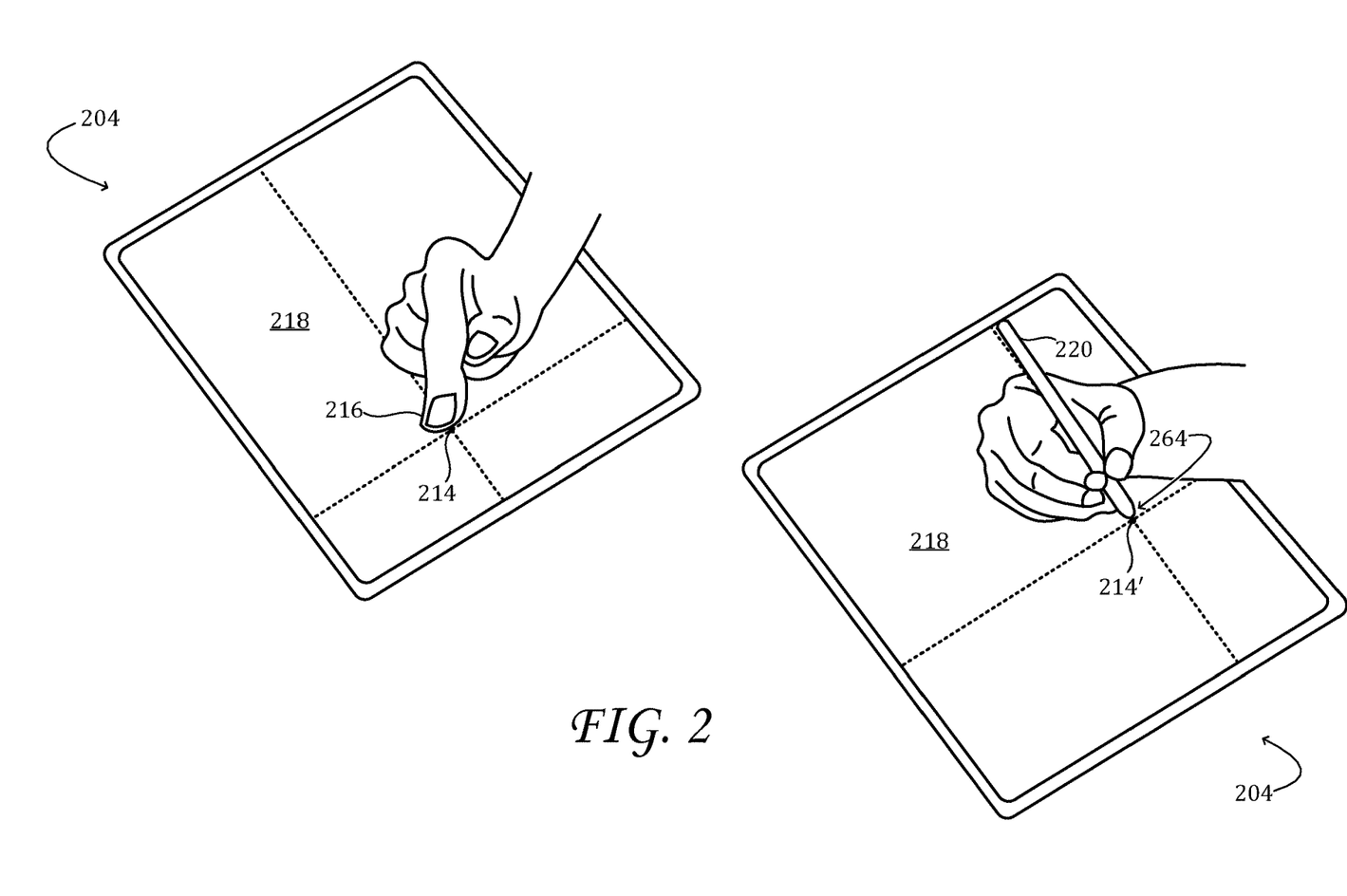
FIG. 2 shows aspects of another example electronic device having a touch sensor.

FIG. 2 shows additional aspects of an example touch sensor 204. The illustrated touch sensor is configured to sense at least one touch point 214 effected by the user. An example touch point is the point of contact between the user's fingertip 216 and sensory surface 218 of the touch sensor. As described hereinafter, touch sensor 204 may also be configured to sense the point of contact 214' of an input device, such as touch-screen stylus 220, on the sensory surface.

Figure 3:
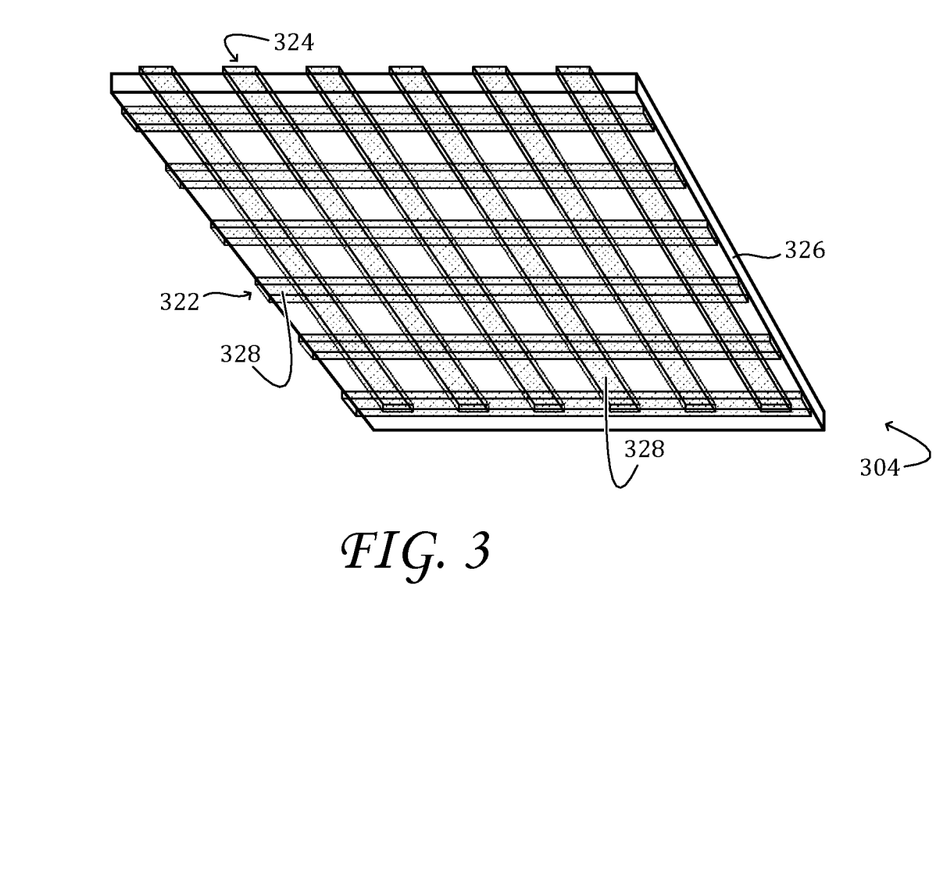
FIG. 3 shows aspects of an example capacitive touch sensor.

FIG. 3 shows additional aspects of an example capacitive touch sensor 304 in expanded detail. The capacitive touch sensor comprises a series of row electrodes 322 that cross a series of column electrodes 324. Touch sensors here contemplated may include any number N of row electrodes and any number M of column electrodes. Although it is customary to have the row electrodes aligned horizontally and the column electrodes aligned vertically, that aspect is in no way necessary, as the terms 'row' and 'column' may be exchanged everywhere in this description. In the illustrated example, the series of row electrodes 322 is arranged on one face of a dielectric layer 326, and the series of column electrodes 324 is arranged on the opposite face of the dielectric layer. The dielectric layer may be 50 to 100 μm in some examples, while other thickness ranges are also envisaged. The dielectric layer may comprise a polymer film, such as polyethylene terephthalate (PET). In curved, flexible and/or bendable electronic devices, the dielectric layer may be curved, flexible and/or bendable. Row electrodes 322 and column electrodes 324 each comprise electronically conductive material 328 in the form of narrow (e.g., one mm-wide), elongate bands on the opposite faces of dielectric layer 326. Adjacent electrodes may be separated by one to five millimeters in some examples. The composition of electronically conductive material 328 is not particularly limited. The electronically conductive material may comprise a metallic microwire mesh, a metal-particle or metal-island film, or a film of a degenerately doped semiconductor, such as indium-tin oxide (ITO), for instance.

Figure 4:
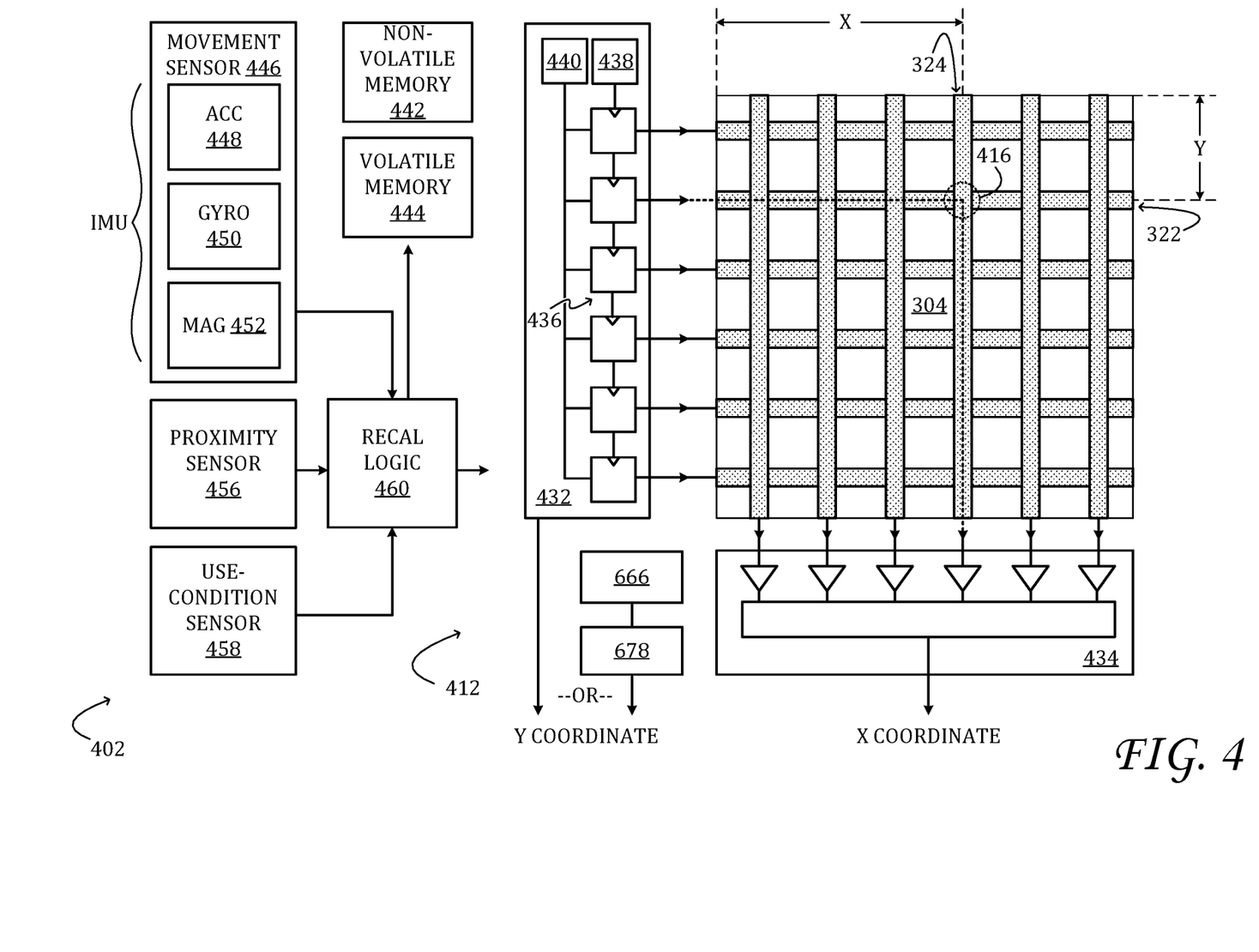
FIG. 4 shows aspects of an example electronic device having a touch sensor and a digitizer.

FIG. 4 shows aspects of an example electronic device 402, including capacitive touch sensor 304 and a digitizer 412. In the illustrated example, row electrodes 322 and column electrodes 324 of the capacitive touch sensor are addressed by the digitizer. The digitizer is configured to sense contact on or near the sensory surface of the touch-screen display device, including coordinates (X, Y) directly beneath the point of contact 416 of a finger or touch-screen stylus. To that end, the digitizer includes row-drive circuit 432 and column-sense circuit 434. The terms 'row-drive' and 'column-sense' are appropriate for configurations in which drive signal is driven through the row electrodes and sensed via the column electrodes. Naturally, the opposite configuration is also envisaged.

Column-sense circuit 434 is configured to sense column signal from the series of column electrodes 324. In the illustrated example, the column-sense circuit includes M column amplifiers, each coupled to a corresponding column electrode. Row-drive circuit 432 includes a local row counter 436 in the form of an N-bit shift register with outputs driving each of the N row electrodes 322. The local row counter is clocked by row-driver clock 438. The local row counter includes a blanking input to temporarily force all output values to zero irrespective of the values stored within the shift-register. Excitation of one or more rows may be provided by filling the local row counter with ones at every output to be excited, and zeroes elsewhere, and then toggling the blanking signal with the desired modulation from modulation clock 440. In the illustrated example, the output voltage may take on only two values, corresponding to the one or zero held in each bit of the local row counter. In other examples, the output voltage may take on a greater range of values, to reduce the harmonic content of the output waveforms or decrease radiated emissions, for instance. In some examples, row-drive circuit 432 may include one or more additional registers offset with respect to local row counter 436 and blanked by modulation clocks of different frequencies. Such variants enable concurrent excitation of two or more row electrodes (e.g., electrodes separated by a fixed number of intervening rows).

Row-drive circuit 432 of FIG. 4 applies an excitation pulse to each row electrode 322 in sequence. In this manner, the row-drive circuit is configured to concurrently drive one or more row electrodes of the series of row electrodes while leaving undriven one or more other row electrodes of the series of row electrodes. During a period in which the sensory surface is untouched, none of the column amplifiers registers an above-threshold output. However, the electrical impedance at each crossing of a row electrode 322 and a column electrode 324 is responsive to the proximity of a finger or stylus to that crossing: when the user places a fingertip on the sensory surface, the fingertip capacitively couples one or more row electrodes 322 proximate to (e.g., crossing) touch point 416 to one or more column electrodes 324 also proximate to the touch point. The capacitive coupling induces an above-threshold signal from the column amplifiers associated with the column electrodes behind the touch point.

Column-sense circuit 434 returns, as the X coordinate of the touch point, the numeric value of the column providing the greatest signal received. Digitizer 412 determines which row was being excited when the greatest signal was received and returns the numeric value of that row as the Y coordinate of the touch point. In some examples, column-sense circuit 434 may also return a Z coordinate that varies in dependence on the strength of the signal received at coordinates (X, Y). Accordingly, digitizer 412 may distinguish firm touch, associated with strong signal, from light touch, associated with weaker signal, and from hover, associated with still weaker but detectable signal.

Despite the utility of capacitive touch sensing as outlined above, the signal-to-noise ratio for sensing the touch point is affected by baseline coupling between pairs of row and column electrodes, which persists even when the crossing between the electrodes is untouched. Such coupling may be due to dielectric layer 326 itself or to the common electrode of a display panel and/or other components of electronic device 402. Generally speaking, the magnitude of the baseline coupling may vary from one electrode crossing to another in the same touch sensor. Inevitable tolerances in the manufacture of an electronic device make accurate prediction of the baseline coupling very difficult.

To enable correction of the column signal for the effect of the baseline coupling ('baseline correction' herein), factory calibration of a touch sensor optionally can be enacted during manufacture of the electronic device in which the touch sensor is installed. In factory calibration, while the touch sensor is untouched, excitation signal is applied to each row electrode 322 in sequence, and the column signal from each amplifier of column-sense circuit 434 is recorded. Based on the series of column signals recorded in this manner, each of a plurality of (X, Y) coordinates of the touch sensor is mapped to a corresponding touch-free capacitance. The term 'touch-free capacitance' refers herein to the capacitance between a given pair of row and column electrodes in the absence of user touch. When factory calibration is enacted, the resulting calibration mapping is saved in non-volatile memory 442 of the electronic device—e.g., flash memory. In some examples the factory-calibration process is repeated at each of the excitation frequencies used in normal operation by row-drive circuit 432. After the factory calibration, and when the electronic device is in use, the calibration mapping is retrieved from the non-volatile memory and used to correct the column signal from column-sense circuit, thereby reducing or eliminating the effect of the baseline coupling on the column signal and improving the signal-to-noise ratio for touch-point detection.

The terms 'mapping' and 'mapped to a corresponding touch-free capacitance' should be interpreted broadly in this disclosure. In some examples a calibration mapping is a matrix-like data structure wherein a corresponding numeric value is stored for each crossing (I, j) of row and column electrodes, where i ranges from 1 to N and j ranges from 1 to M. In some examples, plural numeric values corresponding to different excitation frequencies may be stored for each crossing of row and column electrodes. In some examples the numeric value or values stored may be proportional to the touch-free capacitances measured at the crossing. In other examples, a surrogate metric proportional to the touch-free admittance or impedance may be stored. In still other examples, the touch-free capacitance, admittance, or impedance may be transformed mathematically to improve storage efficiency and/or subsequent processing efficiency (when used for correction of the column signals). In still other examples, the calibration mapping may not comprise discrete numeric values corresponding to every electrode crossing but may comprise an aggregate representation, such as the coefficients of a polynomial or Fourier series fit to a touch-free capacitance, admittance, or impedance measurement. In the spirit of these and all other suitable variants, each of a plurality of (X, Y) coordinates of the touch sensor is mapped, directly or indirectly, to a corresponding touch-free capacitance.

Factory calibration enables correction for built-in variability of the baseline coupling but not for variability due to device damage and/or ageing or to the operating environment of an electronic device. Environmental factors liable to affect the baseline coupling include condensing atmospheric humidity, perspiration from the user's hand, dirt deposited on the sensory surface, and ambient electromagnetic noise. In order to correct for post-manufacturing variability in the baseline coupling, a touch sensor may be recalibrated at suitable intervals during its lifetime. Recalibration may follow the same procedure described above with respect to factory calibration. The resulting calibration mapping is saved in volatile memory 444, however (e.g., random-access memory), and overwritten each time the recalibration is successful. Thus, successful recalibration comprises replacement of a stored calibration mapping each of a plurality of (X, Y) coordinates of the touch sensor to a corresponding touch-free capacitance. In the interval between consecutive recalibrations, the calibration mapping can be used to correct the column signal for the effects of baseline coupling.

A significant operational difference between factory calibration and recalibration is that conditions during recalibration cannot be controlled as they are in the factory. At a minimum it is desirable to ensure that no finger or touchscreen stylus is in contact with the sensory surface during the recalibration. It also may be desirable to ensure that the electronic device is not in the user's hand, or even that there is no nearby person liable to handle the electronic device during the recalibration. In some examples a provisional calibration mapping is acquired in the manner above, saved in volatile memory 444, and then tested to rule out user contact with the touch sensor. Each time a provisional calibration mapping passes the test, that mapping is committed for use in subsequent baseline correction—i.e., the touch sensor has now been 'recalibrated'. One technical benefit of this approach is that, unlike the factory calibration map which is saved in non-volatile memory 442 and can be updated only a finite number of times, the provisional calibration map can be updated as often as desired, to maintain reliable calibration. Moreover, a provisional calibration mapping that fails the test can simply be ignored until the next update. Typically a provisional calibration mapping passes the test if it sufficiently resembles an expected calibration mapping (vide infra). A disadvantage of that approach, when used to the exclusion of other heuristics, is that it may erroneously suppress recalibration in corner cases, where the sensor is untouched but the provisional calibration mapping deviates significantly from the expected due to unpredictable conditions—device damage and/or ageing, condensing humidity, dirt, electromagnetic noise, etc.

In order to address this issue and provide further advantages, electronic device 402 includes a movement sensor 446 having an output that varies in dependence on movement of the electronic device. Such movement may include translational movement and/or rotational movement. In some examples the output of the movement sensor may be a binary output—viz., the movement of the electronic device does or does not exceed a predetermined threshold. Thus, movement sensor 446 may sense the absence of movement, in some examples. In other examples the movement may be resolved into translational and rotational components and/or quantified. In the example of FIG. 4, movement sensor 446 includes an inertial measurement unit (IMU) comprising linear accelerometer 448, electronic gyroscope 450, and magnetometer 452. The linear accelerometer is configured to sense a linear acceleration vector—e.g., linear acceleration along three, mutually orthogonal axes. The gyroscope is configured to sense angular velocity—e.g., a vector of rotational velocities about three, mutually orthogonal axes. The magnetometer optionally can be used to detect and correct sensor drift within the electronic gyroscope and/or accelerometer. Operationally, an electronic gyroscope is also an acceleration sensor, because of the relation between angular velocity and angular acceleration. The combined output of an IMU may be referred to as a six degrees-of-freedom (6DOF) measurement.

Generally speaking, the output of the linear accelerometer varies in dependence on the linear acceleration of the electronic device, thereby resolving and quantifying translational movement. The output of the electronic gyroscope varies in dependence on the rotational velocity of the electronic device, thereby resolving and quantifying rotational movement. In some examples, the output of the movement sensor is subjected to a sensor-fusion process, combining linear-accelerometer, electronic-gyroscope, and magnetometer outputs to reveal and quantify device movements of particular relevance to the methods herein. Despite the practical advantages of IMU-based movement sensing, other components of electronic device 402 can be used to sense movement, alternatively or in addition. For instance, camera 154 may be configured to acquire video which is analyzed in the electronic device for indications of device movement. Such indications may include discovery of consecutive frames of video related by invariant affine transformation, for example.

Continuing in FIG. 4, electronic device 402 includes a proximity sensor 456 having an output that varies in dependence on proximity of a person to the electronic device. In some examples the proximity sensor includes a camera—e.g., a depth camera such as a time-of-flight, stereo, or structured-light camera—and/or a color camera. In other examples, the proximity sensor may include a sonar sensor, radio-frequency radar sensor, or a non-imaging optical time-of-flight sensor. In some examples the output of the proximity sensor may be a binary output—viz., an output that detects whether a person is or is not within a predetermined threshold distance from the electronic device. In other examples the proximity sensor may be configured to estimate distance to a detected person, or to the closest detected person in its field-of-view. In some examples the proximity sensor is configured to employ a mode of person detection based on motion in the field-of-view of the sensor. Accordingly, it may not be necessary in every example to resolve a human subject in the field-of-view; rather, detection of a moving subject can be used to indicate that the subject is a person. In other examples machine-vision technology can be used to distinguish a human being from other subjects imaged and to sense proximity to the imaged human being.

Optionally, electronic device 402 may include a use-condition sensor 458 configured to provide output that varies in dependence on a use condition of the electronic device. The function and configuration of the use-condition sensor are not particularly limited. In some examples the use-condition sensor may comprise software that polls the operating system of the electronic device to determine whether a soft keyboard and/or speech-to-text interface is active. In a hinged electronic device the use-condition sensor may comprise a hardware sensor configured to sense the hinge angle—i.e., the opening angle of a device having a second display screen or other covering which folds over the touch sensor.

Electronic device 402 includes recalibration logic 460 configured to control OTE recalibration of the touch sensor. The recalibration logic initiates a recalibration attempt, acquires a provisional calibration mapping and other relevant data (data from movement sensor 446, for example) and then decides, based on the data, whether to commit the provisional calibration mapping for subsequent baseline correction. This sequence is repeated at suitable intervals during operation of the electronic device, such that successful recalibrations are completed at some aggregate rate (i.e., incidence). In effect, the recalibration logic is configured to vary the rate of successful recalibration of the touch sensor based at least partly on the output of movement sensor 446. In some examples, the rate is varied based on the output of proximity and/or use condition sensors as well. As used herein, the act of 'varying the rate' is functionally equivalent to, for a single recalibration attempt, deciding whether or not to replace the current calibration mapping and thereby recalibrate the touch sensor. One technical effect of varying the rate of successful recalibration in dependence on the sensory data is that recalibrations that might otherwise occur during high risk of user interference are avoided. Conversely, recalibrations are enabled when the risk of user interference is lower, thereby securing a fuller benefit from OTF recalibration. In short, the sensory data provides a more reliable indication of the risk conditions than heuristic evidence from the provisional calibration map alone.

To these ends, the recalibration logic may be configured to receive, combine, transform, and/or process the output from any sensor of the electronic device. In some examples sensory output may be combined with data maintained by an operating system or other process executing on the electronic device. An illustrative process used in this manner may include a person-recognition process that receives sensory output from a depth camera of the electronic device and evaluates the probability that a person is present at specified coordinates. Naturally the decisions made by the recalibration logic remain 'based on' the sensory output even when such output is transformed by intervening layers of processing. In some examples the recalibration logic may enact a sensor-fusion approach wherein linear combinations of plural sensory inputs are computed in order to yield a fused output which is a better indicator than any individual output of whether or not to recalibrate the touch sensor.

Figure 5:
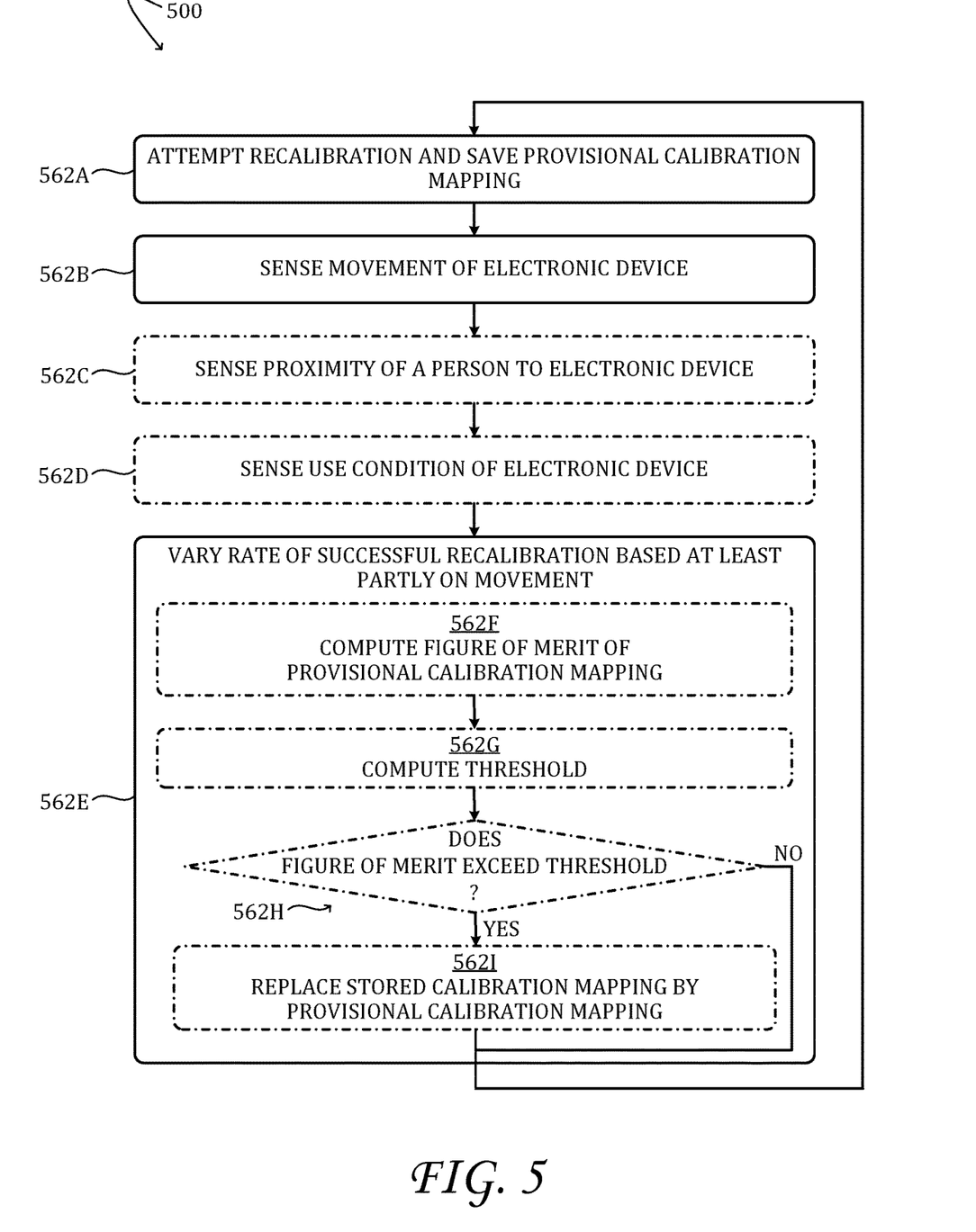
FIG. 5 shows aspects of an example method for recalibrating a touch sensor of an electronic device.

More particular functionality of the recalibration logic is described immediately below, in connection to FIG. 5, which shows aspects of an example method 500 for recalibrating a touch sensor of an electronic device. For ease of illustration, method 500 is described with continued reference to the configurations hereinabove. It will be understood, however, that the method may be supported by other configurations as well.

At 562A of method 500, recalibration logic of the electronic device attempts recalibration of the touch sensor, as described hereinabove. The recalibration may be attempted periodically, intermittently, according to a schedule, or responsive to a trigger. For example, recalibration may be attempted soon after the electronic device powers up or wakes, and every 30 to 60 seconds thereafter until the electronic device sleeps or is powered down. In some examples the interval for attempting recalibration may depend on a figure of merit of the calibration mapping currently in use. For example, if the current calibration mapping is within a threshold variance of an expected calibration mapping, then a relatively long attempt interval (e.g., 60 seconds) can be maintained. However, if the calibration mapping varies significantly from the expected calibration mapping, then the interval for requested calibration may be shortened. More generally, the attempt interval may be adjusted dynamically pursuant to changing variance. In some examples, the attempt interval may be adjusted based on device temperature, as more frequent recalibration may be desired when the device temperature is labile (recognizing that device temperature may affect the baseline coupling via material expansion and other factors). When recalibration is attempted, the recalibration logic excites each row electrode of the touch sensor in sequence, measures the resulting column signals, and assembles a provisional calibration mapping based on the column signals. As described hereinabove, the provisional calibration mapping maps each of a plurality of (X, Y) coordinates of the touch sensor to a corresponding touch-free capacitance. The calibration mapping can be saved in volatile memory of the electronic device.

At 562B of method 500, movement of the electronic device is sensed via a movement sensor of the electronic device. In some examples the movement may include translational movement. In some examples the movement may include rotational movement. In some examples the movement may be resolved into linear and rotational component movements and/or quantified, as described hereinabove. Generally speaking, higher-resolution modes of movement detection enable more sophisticated decision making on whether to accept or reject a provisional calibration mapping.

At 562C, proximity of a person to the electronic device is sensed via any suitable proximity sensor of the electronic device. At 562D, a use condition of the electronic device is sensed via any suitable use-condition sensor of the electronic device. In some examples, the use-condition sensor may comprise a hinge-angle sensor. In some examples, steps 562C and/or 562D may be omitted from the method.

Generally speaking, each provisional calibration mapping saved at 562A will either be accepted or rejected by the recalibration logic. If the request is accepted then the provisional calibration mapping is committed for use, replacing the current calibration mapping, and the touch sensor is now recalibrated. If the provisional calibration mapping is rejected, then the existing calibration mapping is left unchanged, and the touch sensor is not recalibrated. (If the first provisional calibration mapping after power-up is rejected, then a default, factory-calibration mapping, if available, may be loaded from non-volatile memory.) In this manner, the decision to accept or reject a provisional calibration mapping influences the rate of successful recalibration of the touch sensor—i.e., the number of completed recalibrations per unit of time, over a relevant interval of time. In that context, at 562E of method 500 the rate of successful recalibration of the touch sensor is varied based at least partly on the movement sensed at 562B.

Movement exceeding an appropriate threshold indicates heuristically that the non-autonomous electronic device is being manipulated by the user and may be in use. Under such conditions, the user is liable to approach the touch sensor with a finger or stylus, thereby corrupting any provisional calibration mapping that may be assembled. Under such conditions, the recalibration logic may reject one or more provisional calibration mappings, thereby lowering the rate of successful recalibration relative to the rate of successful recalibration when no movement is sensed. Some forms of device movement are more indicative of user interaction than others. For instance, abrupt movement strongly suggests that the device is being manipulated, whereas steady movement is likely to indicate that electronic device is being transported in a vehicle and may be safe to recalibrate. Thus, in some examples, the rate of successful recalibration may be lowered by an amount commensurate with the amount and/or character of linear acceleration and/or angular velocity sensed.

Figure 6A:
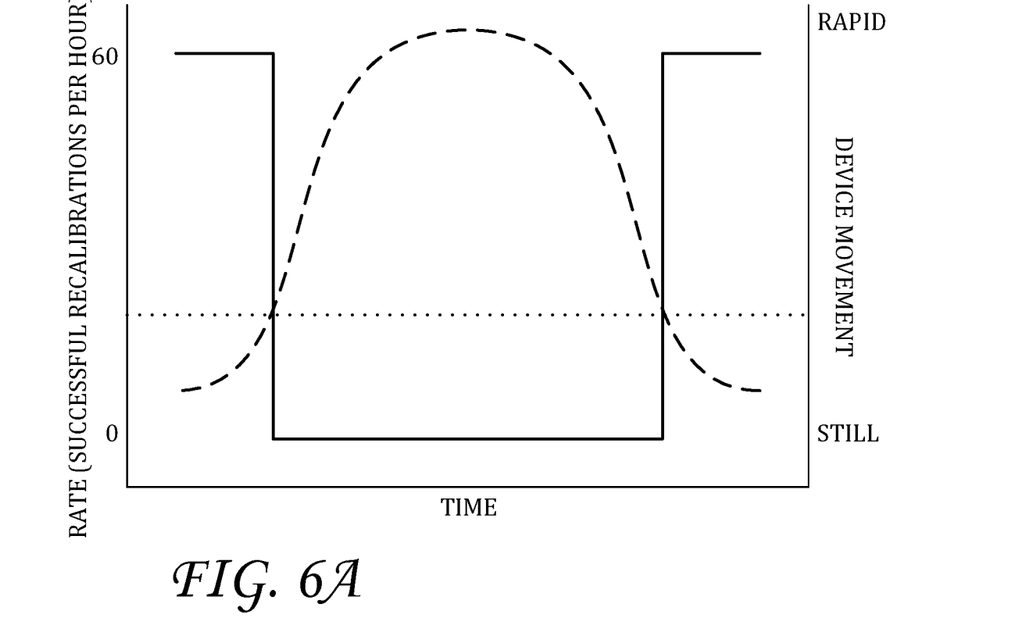
FIG. 6A is a prophetic representation of device movement and rate of successful recalibration plotted versus time in an example operating scenario.

The effect of device movement on the rate of successful recalibration is illustrated by example in FIG. 6A, where the dashed line represents device movement and the solid line represents the rate of successful recalibration, both plotted against time as the provisional calibration mapping and other conditions remain fixed. In the illustrated example, the touch sensor is recalibrated about twelve times per minute when the device movement is less than a certain value, and recalibrated zero times per minute when the device movement is above that value.

In examples in which the proximity of a person to the electronic device is sensed via a proximity sensor, the rate of successful recalibration may be varied further based on the proximity as reflected in the output of the proximity sensor. In a manner analogous to device movement, proximity to a human being indicates heuristically that the electronic device is liable to be approached by a finger or stylus, thereby corrupting the provisional calibration mapping. In some examples, a person sensed within a threshold distance of the electronic device may have the effect of lowering the rate of successful recalibration, relative to the rate of successful recalibration when no person is within the threshold distance. In some examples, the rate may be lowered by an amount commensurate with the proximity sensed—the closer the person is, the more the rate is lowered.

Figure 6B:
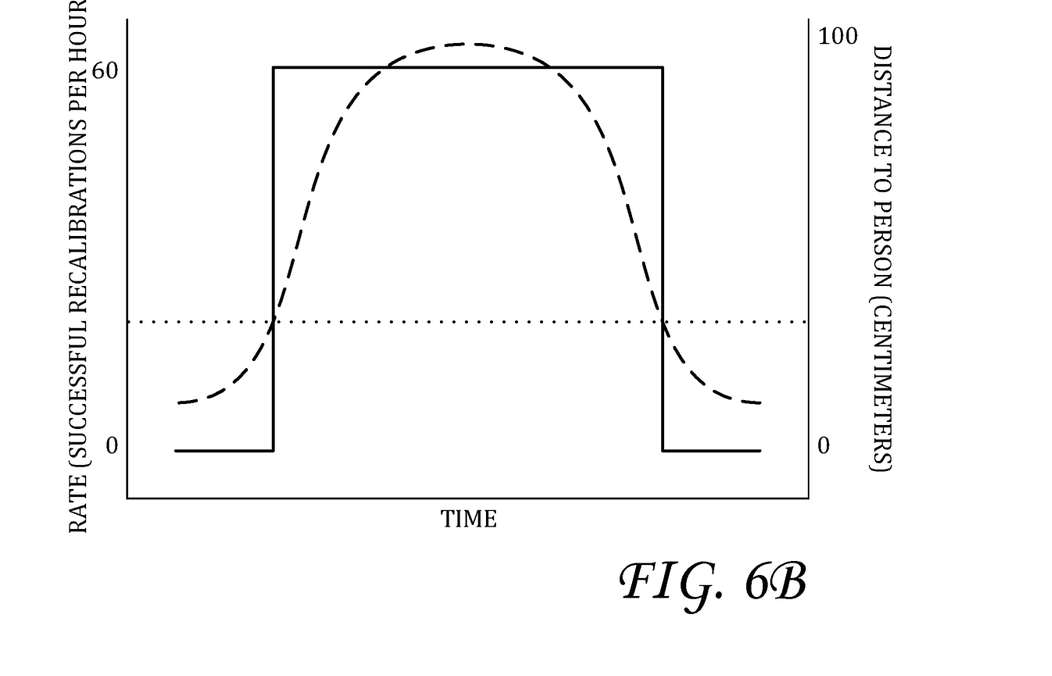
FIG. 6B is a prophetic representation of distance to a person and rate of successful recalibration plotted versus time in an example operating scenario.

The effect of proximity to a person on the rate of successful recalibration is illustrated by example in FIG. 6B, where the dashed represents distance to the nearest person in the field of view of the proximity sensor and the solid line represents the rate of successful recalibration, both plotted against time as the provisional calibration mapping, the device movement, and other conditions remain fixed. In the illustrated example, the touch sensor is recalibrated about twelve times per minute when the distance is greater than a certain value, and recalibrated zero times per minute when the distance is below that value.

In examples in which a use condition of the electronic device is sensed via a use-condition sensor, the rate of successful recalibration may be varied further based on the use condition as reflected in the output of the use-condition sensor. In the particular example in which the electronic device is a hinged device with opposing touch sensors (as shown in FIGS. 1A through 1C), it may be advantageous to encourage recalibration success when the hinge angle H is within a predetermined interval of 180 degrees, such that excitation signal from one touch sensor is unlikely to interfere with recalibration of the opposing touch sensor. Conversely, it may be advantageous to discourage recalibration success when the hinge angle is acute. In devices in which one of the hinged portions can be rotated behind the other, it may be desirable to encourage recalibration success only for the touch sensor on top. In typical operating scenarios, device movement, proximity to a person, use conditions, and the provisional calibration mapping are all subject to change with within any given time interval. Pursuant to such change, the recalibration logic may vary the number of recalibrations completed during that interval, and thus, the aggregate rate of successful recalibration.

In these and other examples, method 500 may apply detailed recalibration logic informed by the sensory inputs. In particular, the recalibration logic may decide whether to accept or reject each provisional calibration mapping by comparing a figure of merit of the provisional calibration mapping to a threshold that varies in dependence on the sensory inputs. This approach preserves the utility of similarity assessment of the provisional calibration mapping, but provides the additional technical benefit of avoiding incorrect recalibration decisions by using the sensory inputs to adjust the similarity threshold. As one example of this approach, the rate of successful recalibration may be varied as follows.

Returning now to FIG. 5, at 562F of method 500 the recalibration logic computes a figure of merit of the provisional calibration mapping. The figure of merit, as noted hereinabove, is a measure of the degree to which the provisional calibration mapping resembles an expected provisional calibration mapping. In some examples, the figure of merit is $1-\rho$, where $\rho$ is a residual, normalized to the interval [0,1], of a least-squares fitting procedure fitting the provisional calibration mapping to an expected calibration mapping or polynomial model thereof.

At 562G is computed a threshold against which the figure of merit will be compared. In some examples the threshold varies in dependence on the movement—viz., on the output of the movement sensor of the electronic device which senses the amount and/or direction of the movement. In some examples the movement is quantified by mutually orthogonal components $\alpha_1$, $\alpha_2$, $\alpha_3$ of linear acceleration and mutually orthogonal components $\alpha_4$, $\alpha_5$, $\alpha_6$ of angular velocity. Accordingly, threshold T may be defined as $$T = \sum_{i=1}^{6} c_i a_i,$$

where $c_1$, ... $c_6$ are appropriately optimized non-negative coefficients.

In some examples the threshold varies in dependence on the movement and on the proximity—e.g. the output of the proximity sensor which varies in dependence on proximity to the nearest person sensed. Accordingly, threshold T may be defined as $$T = \sum_{i=1}^{7} c_i a_i,$$

where $\alpha_7$ is the reciprocal distance to the nearest person sensed, $c_7$ is an appropriately optimized non-negative coefficient, and $\alpha_1, \ldots \alpha_6$ and $c_1, \ldots c_6$ are defined as above.

In some examples the threshold varies in dependence on the movement, on the proximity, and on one or more additional parameters associated with a use condition of the electronic device—e.g., on the output of one or more use-condition sensors of the electronic device. Accordingly, threshold T may be defined as $$T = \sum_{i=1}^{n} c_i a_i,$$

where n is the total number of movement, proximity, and use-condition parameters considered, $\alpha_8, \ldots \alpha_n$ are the use-condition parameters, $c_8, \ldots c_n$ are appropriately optimized coefficients, and all the other symbols are defined as above. In one example $\alpha_8$ is hinge angle H as shown in FIG. 1B, and $c_8$ is positive.

The skilled reader will appreciate that thresholds varying non-linearly with one or more parameters $\alpha_i$ can be realized by extending the linear combinations to include integer powers $\alpha_i^2$, $\alpha_i^3$, etc., with additional coefficients. Further, appropriate thresholds can be constructed as functions of several parameters using constructions other than linear combinations.

At 562H the computed figure of merit is compared against the computed threshold. At 562I the recalibration logic, conditional on whether the figure of merit exceeds the threshold, replaces the currently stored calibration mapping with the provisional calibration mapping, thereby recalibrating the touch sensor according to the provisional calibration mapping. As described hereinabove, successful recalibration comprises replacing the current calibration mapping and committing the provisional calibration mapping for subsequent use.

It is instructive to consider certain limiting cases according to this approach. When the device is not moving and user is far away ($\alpha_1, \ldots \alpha_7 \approx 0$), practically any provisional calibration mapping will have a figure of merit that exceeds the threshold, so successful recalibration will proceed at the maximum rate requested. When there is no movement but user is nearby ($\alpha_1, \ldots \alpha_6 \approx 0$, $\alpha_7 \gg 0$), then the provisional calibration mapping is tested primarily based on distance to the user, which thereby controls the rate of successful recalibration. Conversely, when there is movement but no user is detected—e.g., the user is located at a strange angle, out of the field-of-view of the proximity sensor ($\alpha_7 \approx 0$)—then the rate of successful recalibration is controlled based primarily on the movement. This variant addresses an important failure mode that may be observed in systems having a proximity sensor but no movement sensor.

No aspect of the drawings or description should be interpreted in a limiting sense, because numerous variations, additions, and omissions are also envisaged. For instance, OTF recalibration is presented hereinabove as technology that makes factory calibration—and non-volatile storage of a factory-calibration map—unnecessary in many cases. In other examples, however, factory calibration and OTF recalibration may be used together, for combined benefits. In particular, the recalibration logic may default to a stored factory-calibration mapping in the event that no provisional calibration mapping has been accepted over a threshold number of recalibration intervals.

In the description above a provisional calibration mapping is assembled each and every time recalibration is attempted, and it is the similarity between provisional and expected calibration mappings that is tested against appropriate thresholds, to determine whether or not to commit the recalibration. In related methods, it may not be necessary to assemble a complete provisional calibration mapping in order to determine whether the column signal from the touch sensor sufficiently resembles expected touch-free signal. In alternative examples, the column signals may be tested in a more native state, to assess similarity to touch-free signals, and additional processing to assemble a new calibration map may be enacted only after it has been determined that the column signals have passed the test.

In some examples, a capacitive touch sensor may sense the touch point of a passive or active touch-screen stylus on the sensory surface. The touch point of a passive touch-screen stylus is sensed just like the user's finger, but the touch point of an active touch-screen stylus may be sensed somewhat differently. For instance, an active touch-screen stylus may be configured to inject charge into the column electrode directly beneath the touch point, instead of capacitively coupling that column electrode to any row electrode. Nevertheless, baseline coupling between row and column electrodes of the touch sensor may also affect the signal-to-noise ratio for detection of the touch point of an active stylus on the touch sensor, as certain noise-removal strategies used in connection with an active stylus rely on accurate touch estimation. Accordingly, the configurations and methods above apply analogously to that operating scenario.

As noted above, the methods herein may be tied to a computer system of one or more computing devices. Such methods and processes may be implemented as an application program or service, an application programming interface (API), a library, and/or other computer-program product.

Figure 7:
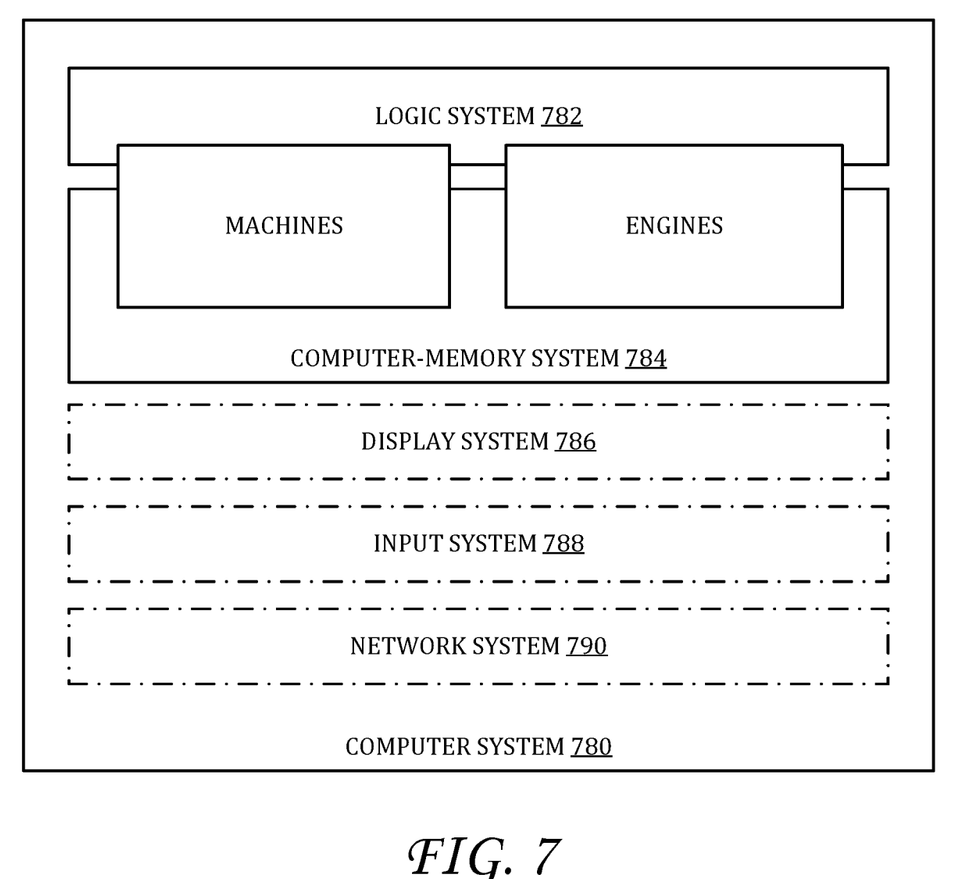
FIG. 7 is a schematic representation of an example computer system.

FIG. 7 provides a schematic representation of a computer system 780 configured to provide some or all of the computer system functionality disclosed herein. Computer system 780 may take the form of a personal computer, application-server computer, or any other computing device.

Computer system 780 includes a logic system 782 and a computer-memory system 784. Computer system 780 may optionally include a display system 786, an input system 788, a network system 790, and/or other systems not shown in the drawings.

Logic system 782 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 784 includes at least one physical device configured to temporarily and/or permanently hold computer system information, such as data and instructions executable by logic system 782. When the computer-memory system includes two or more devices, the devices may be collocated or remotely located. Computer-memory system 784 may include at least one volatile, nonvolatile, dynamic, static, read/write, read-only, random-access, sequential-access, location-read addressable, file-read addressable, and/or content-read addressable computer-memory device. Computer-memory system 784 may include at least one removable and/or built-in computer-memory device. When the logic system executes instructions, the state of computer-memory system 784 may be transformed—e.g., to hold different data.

Aspects of logic system 782 and computer-memory system 784 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 782 and computer-memory system 784 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 786 may be used to present a visual representation of data held by computer-memory system 784. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 788 may comprise or interface with one or more input devices. An input device may include a sensor device or a user input device. Examples of user input devices include a keyboard, mouse, or touch screen.

When included, network system 790 may be configured to communicatively couple computer system 780 with one or more other computer systems. The network system may include wired and/or wireless communication devices compatible with one or more different communication protocols. The network system may be configured for communication via personal-, local- and/or wide-area networks.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

In conclusion, one aspect of this disclosure is directed to a method for recalibrating a touch sensor of an electronic device. The method comprises (a) sensing movement of the electronic device; and (b) varying a rate of successful recalibration of the touch sensor based at least partly on the movement, the successful recalibration comprising replacement of a stored calibration mapping of each of a plurality of (X, Y) coordinates of the touch sensor to a corresponding touch-free capacitance.

In some implementations, the method further comprises sensing proximity of a person to the electronic device, wherein varying the rate of successful recalibration includes varying further based on the proximity. In some implementations, the method further comprises sensing a use condition of the electronic device, wherein varying the rate of successful recalibration includes varying further based on the use condition. In some implementations, varying the rate of successful recalibration includes: assembling a provisional calibration mapping for the touch sensor; computing a figure of merit of the provisional calibration mapping; and conditional on whether the figure of merit exceeds a threshold, replacing a stored calibration mapping, thereby recalibrating the touch sensor according to the provisional calibration mapping. In some implementations, the threshold varies in dependence on the movement. In some implementations, the threshold varies in dependence on the proximity.

Another aspect of this disclosure is directed to an electronic device comprising a touch sensor, a movement sensor, and recalibration logic. The touch sensor is configured to provide input to the electronic device. The movement sensor has an output that varies in dependence on movement of the electronic device. The recalibration logic is configured to vary a rate of successful recalibration of the touch sensor based at least partly on the output of the movement sensor, the successful recalibration comprising replacement of a stored calibration mapping of each of a plurality of (X, Y) coordinates of the touch sensor to a corresponding touch-free capacitance.

In some implementations, the electronic device further comprises a proximity sensor having an output that varies in dependence on proximity of a person to the electronic device, wherein the recalibration logic is configured to vary the rate of successful recalibration further based on the output of the proximity sensor. In some implementations, the electronic device further comprises a use-condition sensor having an output that varies in dependence on a use condition of the electronic device, wherein the recalibration logic is configured to vary the rate of successful recalibration further based on the output of the use-condition sensor. In some implementations, the recalibration logic is further configured to: assemble a provisional calibration mapping for the touch sensor; compute a figure of merit of the provisional calibration mapping; and conditional on whether the figure of merit exceeds a threshold, replace a stored calibration mapping, thereby recalibrating the touch sensor according to the provisional calibration mapping.

In some implementations, the threshold varies in dependence on the output of the movement sensor. In some implementations, the threshold varies in dependence on the output of the proximity sensor. In some implementations, the touch sensor is a capacitive touch sensor. In some implementations, the proximity sensor includes a camera. In some implementations, the movement sensor includes a linear accelerometer, gyroscope, and/or magnetometer. In some implementations, the output of the movement sensor is a product of sensor fusion of linear accelerometer and gyroscope outputs.

Another aspect of this disclosure is directed to a method for recalibrating a touch sensor of an electronic device. The method comprises: (a) sensing movement of the electronic device; (b) sensing proximity of a person to the electronic device; and (c) varying a rate of successful recalibration of the touch sensor based at least partly on the movement and on the proximity, the successful recalibration comprising replacement of a stored calibration mapping of each of a plurality of (X, Y) coordinates of the touch sensor to a corresponding touch-free capacitance.

In some implementations, the method further comprises sensing a use condition of the electronic device, wherein varying the rate of successful recalibration includes varying further based on the use condition. In some implementations, the method further comprises: assembling a provisional calibration mapping for the touch sensor; computing a figure of merit of the provisional calibration mapping; and conditional on whether the figure of merit exceeds a threshold, replacing a stored calibration mapping, thereby recalibrating the touch sensor according to the provisional calibration mapping. In some implementations, the threshold varies in dependence on the movement and on the proximity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for recalibrating a touch sensor of a touch-panel device, the method comprising:
   sensing movement of the touch-panel device including the touch sensor; and
   lowering a rate of successful recalibration of the touch sensor responsive at least partly to the movement, the successful recalibration comprising replacement of a stored calibration mapping of each of a plurality of (X, Y) coordinates of the touch sensor to a corresponding touch-free capacitance, wherein lowering the rate of successful recalibration includes:
      assembling a provisional calibration mapping for the touch sensor;
      computing a figure of merit of the provisional calibration mapping, wherein the figure of merit comprises a measure of a degree to which the provisional calibration mapping resembles an expected calibration mapping; and
      replacing the stored calibration mapping with the provisional calibration mapping if the figure of merit exceeds a predetermined threshold.

2. The method of claim 1 further comprising sensing proximity of a person to the touch-panel device, wherein lowering the rate of successful recalibration includes lowering further responsive to the proximity.

3. The method of claim 1 further comprising sensing a use condition of the touch-panel device, wherein lowering the rate of successful recalibration is further based on the use condition.

4. The method of claim 1 wherein the threshold varies in dependence on the movement.

5. The method of claim 2 wherein the threshold varies in dependence on the proximity.

6. A touch-panel device comprising:
   a touch sensor configured to provide input to the touch-panel device;
   a movement sensor having an output that varies in dependence on movement of the touch-panel device including the touch sensor; and
   recalibration logic configured to lower a rate of successful recalibration of the touch sensor responsive at least partly to the output of the movement sensor, the successful recalibration comprising replacement of a stored calibration mapping of each of a plurality of (X, Y) coordinates of the touch sensor to a corresponding touch-free capacitance, wherein lowering the rate of successful recalibration includes:
      assembling a provisional calibration mapping for the touch sensor;
      computing a figure of merit of the provisional calibration mapping, wherein the figure of merit comprises a measure of a degree to which the provisional calibration mapping resembles an expected calibration mapping; and replacing the stored calibration mapping with the provisional calibration mapping if the figure of merit exceeds a predetermined threshold.

7. The touch-panel device of claim 6 further comprising a proximity sensor having an output that varies in dependence on proximity of a person to the touch-panel device, wherein the recalibration logic is configured to lower the rate of successful recalibration further responsive to the output of the proximity sensor.

8. The touch-panel device of claim 6 further comprising a use-condition sensor having an output that varies in dependence on a use condition of the touch-panel device, wherein the recalibration logic is configured to vary the rate of successful recalibration further based on the output of the use-condition sensor.

9. The touch-panel device of claim 6 wherein the threshold varies in dependence on the output of the movement sensor.

10. The touch-panel device of claim 7 wherein the threshold varies in dependence on the output of the proximity sensor.

11. The touch-panel device of claim 6 wherein the touch sensor is a capacitive touch sensor.

12. The touch-panel device of claim 7 wherein the proximity sensor includes a camera.

13. The touch-panel device of claim 6 wherein the movement sensor includes a linear accelerometer, gyroscope, and/or magnetometer.

14. The touch-panel device of claim 6 wherein the output of the movement sensor is a product of sensor fusion of linear accelerometer and gyroscope outputs.

15. A method for recalibrating a touch sensor of touch-panel device, the method comprising:
sensing movement of the touch-panel device including the touch sensor;
sensing proximity of a person to the touch-panel device; and
lowering a rate of successful recalibration of the touch sensor responsive at least partly to the movement and to the proximity, the successful recalibration comprising replacement of a stored calibration mapping of each of a plurality of (X, Y) coordinates of the touch sensor to a corresponding touch-free capacitance, wherein lowering the rate of successful recalibration includes:
assembling a provisional calibration mapping for the touch sensor;
computing a figure of merit of the provisional calibration mapping, wherein the figure of merit comprises a measure of a degree to which the provisional calibration mapping resembles an expected calibration mapping; and
replacing the stored calibration mapping with the provisional calibration mapping if the figure of merit exceeds a predetermined threshold.

16. The method of claim 15 further comprising sensing a use condition of the touch-panel device, wherein lowering the rate of successful recalibration is further based on the use condition.

17. The method of claim 15 wherein the threshold varies in dependence on the movement and on the proximity.

* * * * *